Sept. 29, 1959   L. A. GENETTI, SR   2,906,308
APPARATUS FOR REMOVING SHELL JACKETS FROM DRIED ONIONS
Filed April 19, 1957   2 Sheets-Sheet 1
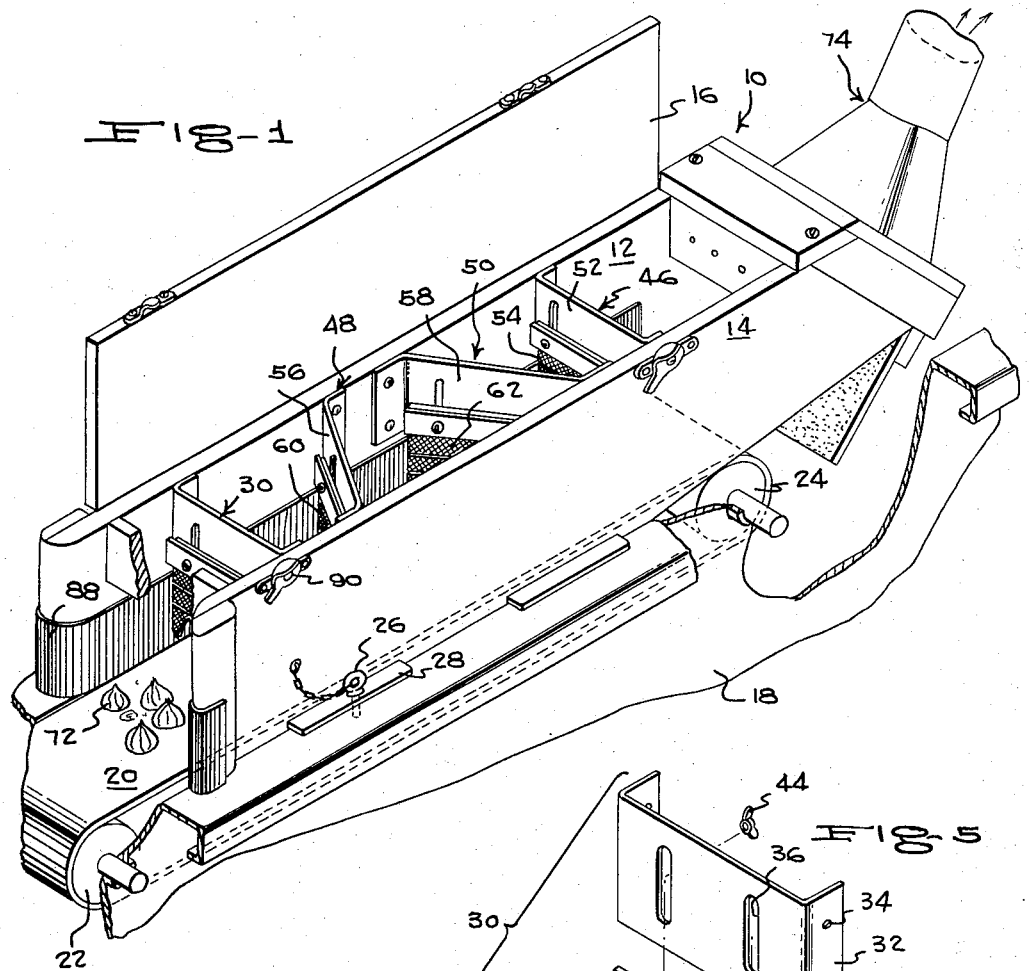
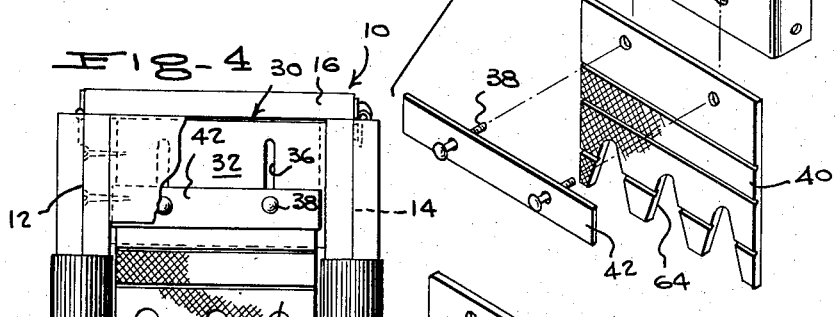
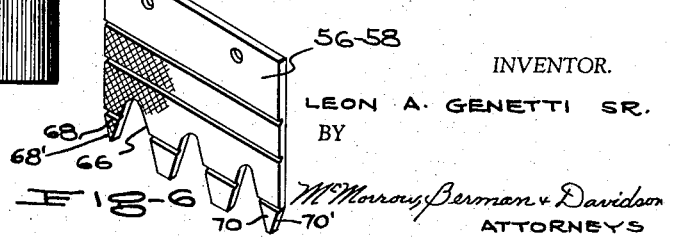
INVENTOR.
LEON A. GENETTI SR.
BY
McMorrow, Berman & Davidson
ATTORNEYS

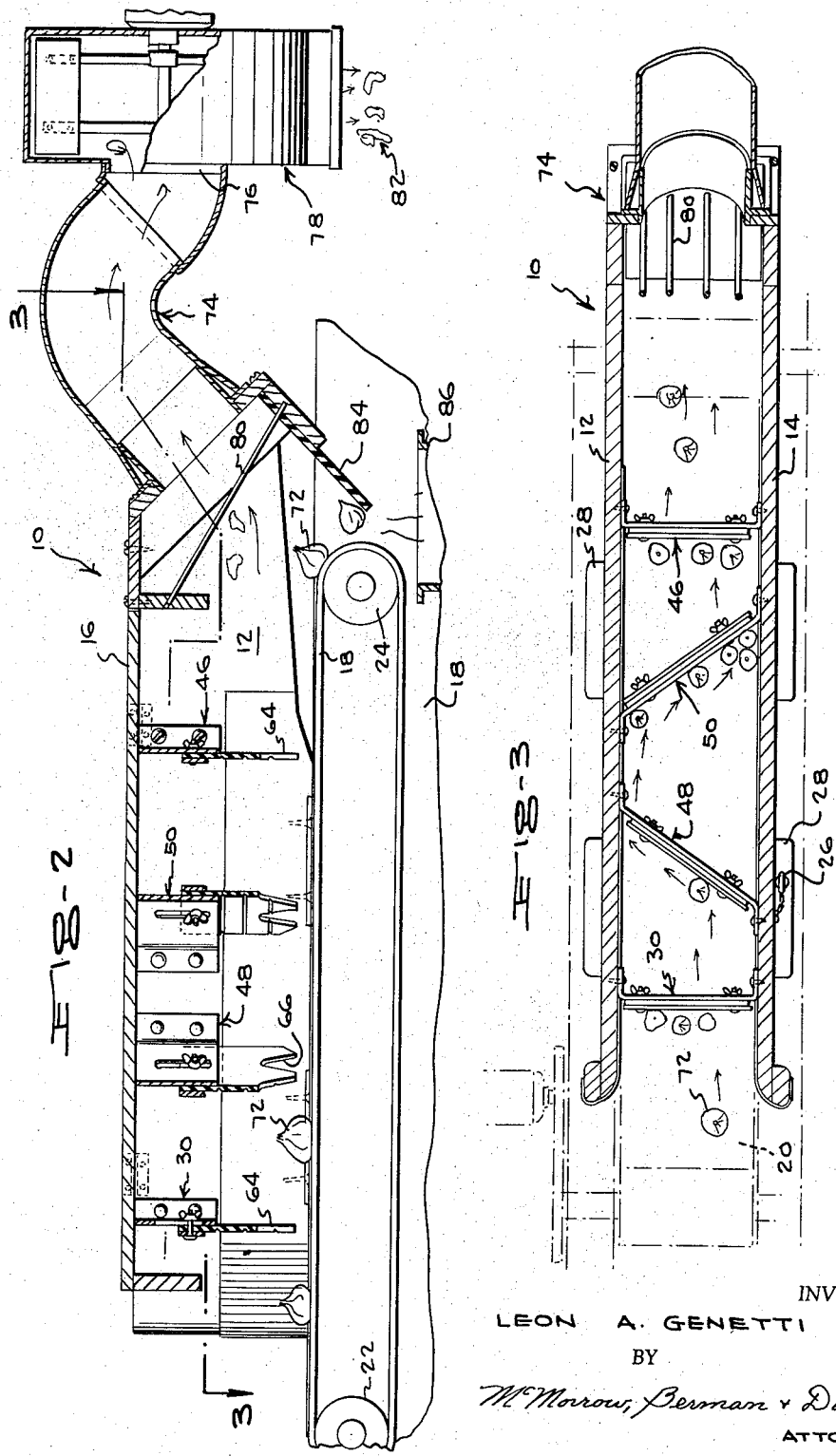

United States Patent Office 2,906,308
Patented Sept. 29, 1959

2,906,308

APPARATUS FOR REMOVING SHELL JACKETS FROM DRIED ONIONS

Leon A. Genetti, Sr., Hazleton, Pa.

Application April 19, 1957, Serial No. 653,881

4 Claims. (Cl. 146—43)

The present invention relates to an apparatus for removing shell jackets from dried onions.

An object of the present invention is to provide an apparatus for removing shell jackets from dried onions which lends itself to efficient cleaning of dried onions in bulk form without bruising the onions, one which may be readily and easily attached to a potato grading table, one which is easily cleaned and adjusted for all sizes of dried onions, and which is highly efficient in action.

Another object of the present invention is to provide an onion cleaning apparatus which is sturdy in construction and of simple structure, one economical to manufacture and assemble, and one which delivers cleaned onions entirely free of any loose shell jacket.

These and other objects and advantages of the present invention will be fully apparent from the following description when taken in connection with the annexed drawings, in which:

Figure 1 is an isometric view of the apparatus according to the present invention, shown installed upon the upper end of a potato grading table, the table being partly broken away, the apparatus being shown with its top in open condition, Figure 2 is a side sectional view of the assembly shown in Figure 1, Figure 3 is a vertical sectional view taken on the line 3—3 of Figure 2, Figure 4 is an end view in elevation, Figure 5 is an exploded isometric view of one of the gates of the apparatus, and Figure 6 is an isometric view of the flexible portion of another gate.

Referring in greater detail to the drawings in which like numerals indicate like parts throughout the several views, the apparatus according to the present invention comprises an open-ended tunnel member 10 having spaced upstanding side pieces 12 and 14 and a top 16 extending over the upper ends of the side pieces 12 and 14 and hingedly connected thereto.

The tunnel member 10 may be easily and quickly installed upon a potato grading table 18 having a power driven conveyor belt 20, constituting a moving platform, installed therein. The belt is supported at each end by rollers 22 and 24, one of which is driven by a suitable means. The belt 20 is movable in the direction indicated by the arrow in Figure 1.

A pin 26, extending through a hole provided in one of the flanges 28 which project outwardly from each of the side pieces 12 and 14 and through a hole provided in the table 18, positions the tunnel member 10 so that the open bottom thereof is in registry with the belt 20.

The belt 20 is received between the side pieces 12 and 14 and has a portion adjacent one end exteriorly of the entrance end of the tunnel member 10 and constitutes a delivery apron for deposit thereon of a supply of dried onions from which the shell jackets are to be removed.

A first upstanding fixed gate 30 is positioned within the tunnel member 10 inwardly of and adjacent the open end of the tunnel member 10 which is closest to the roller 22. The gate 30 extends transversely across the tunnel member 10 and is fabricated, as shown in Figure 5 of two major portions. A U-shaped rigid portion 32 has its legs fixedly secured to the inner walls of the side pieces 12 and 14 by means of screws extending through holes provided in such legs, the holes being designated by the reference numeral 34. Elongated closed slots 36 are provided in the bight of the rigid portion 32 and receive bolts 38 therethrough for securing the flexible portion 40 of the gate 30. A clamping bar 42 extends across the outer face of the flexible portion 40 and receives the bolts 38. Wing nuts 44 are used on each of the bolts 38 for loosening and tightening the bolts 38 when it is desired to adjust the resilient or flexible portion 40 upwardly and downwardly with respect to the rigid portion 32 of the gate 30.

Upstanding second, third and fourth fixed gates 46, 48 and 50, respectively, are positioned within the tunnel member 10 in tandem spaced relation with respect to the gate 30. The second gate 46 is inwardly of and spaced from the gate 30 and extends transversely across the tunnel member 10. The third gate 48 is positioned between and spaced from the gate 30 and the gate 46 and extends diagonally across the tunnel member 10. The fourth gate 50 is positioned and spaced from the gate 46 and the gate 48 and extends diagonally across the tunnel member 10 at an angle opposite to the angle of the gate 48.

The gate 46 is identical in construction with the gate 30, having a rigid upper portion 52 and a flexible lower portion 54 similarly connected together. The gates 48 and 50 are similarly provided with rigid upper portions 56 and 58 and flexible lower portions 60 and 62, respectively. The flanges on the ends of the upper portion 56 of the gate 48 are bent at opposite angles to the flanges of the upper portion 58 of the gate 50.

In Figure 6 one of the lower portions 56 or 58 of the gates 48 or 50 is shown.

The lower portions 40, 54, 60 and 62 of the gates 30, 46, 48, and 50, respectively, are each provided with a plurality of spaced openings, as at 64 in Figures 2, 4 and 5, and at 66 in Figures 2 and 6, of gradually decreasing area, the openings extending vertically from the lower end of the gate lower portion to a point adjacent to and spaced from the upper end of the gate lower portion. Parts of each gate portions 40, 54, 60 and 62 between such openings and at each end of the respective portions form fingers engageable with the onions as the latter are moved through the tunnel member 10 responsive to traveling movement of the belt 20. The end edges 68' and 70' of the end fingers 68 and 70, respectively, of each gate lower portion 56 and 58 are cut at an angle permitting such fingers to be bent in the direction of travel of the belt 20 without abutting the side pieces 12 and 14. The end edges of the gate lower portions 40 and 54 are cut vertically.

Pneumatic means is provided outwardly of the gate 46 for extracting the removed shell jackets as the treated onions emerge from the openings 64 in the gate 46, the onions being designated by the reference numeral 72 in Figures 1 to 3, inclusive.

Specifically, this pneumatic means consists in a hollow extension 74 of the tunnel member 10 positioned exteriorly of the end of the tunnel member 10 adjacent the roller 24 and having one end connected in communication with the open end of the tunnel member 10. The other end of the extension 74 is connected in communication with the inlet opening 76 of a blower 78 which is driven by suitable driving means (not shown) for creating a suction within the extension 74.

A plurality of spaced bars 80 extend across the end of the extension 74 adjacent the tunnel member 10 and serve to restrain movement of the onions 72 into the extension 74, the spacing of the bars 80 being such as to permit the suction therethrough of the removed shell jacket for discharge from the blower 78 as at 82 in Figure 2.

A resilient apron 84 extends below the tunnel member 10 adjacent the extension 74 and is fixed to the one end of the tunnel member 10 and serves to partially close the opening between the adjacent end of the table 18 and the extension 74. The apron 84 is resilient and permits the onions 72 to fall therefrom into a suitable receptacle 86 for removal and packing.

The inner walls of the side pieces 12 and 14 of the tunnel member 10 are provided with a resilient covering as at 88 in Figure 1. The top 16 of the tunnel member 10 is held in its closed position by conventional window sash latches 90 when the top is in the closed position extending over the upper ends of the end pieces 12 and 14.

In use, a supply of onions 72 is put upon the traveling belt 20 adjacent one end of the tunnel member 10 and the onions 72 are carried beneath the fingers provided on the lower portions of the gates 30, 46, 48 and 50, the fingers serving to remove from the onions 72 the shell jackets 82 while the onions 72 are moved through the openings in the respective gates and are moved across the belt 20 in one direction due to the diagonal positioning of the gate 56 and then back across the belt 20 due to the diagonal positioning of the belt 58. It has been found that after a single passage through the tunnel member 10, the onions 72 are entirely cleared and cleaned of their shell jackets and are not bruised by the handling through the tunnel member 10.

What is claimed is:

1. In an apparatus for removing shell jackets from dried onions, an open-ended tunnel member including spaced upstanding side pieces, a moving platform received between said side pieces and having a portion adjacent one end exteriorly of one of the open ends of said tunnel member and constituting a delivery apron for deposit thereon of a supply of dried onions from which the shell jackets are to be removed, a first upstanding gate positioned within said tunnel member adjacent said platform and inwardly of and adjacent said one open end thereof and extending transversely across said tunnel member, a second upstanding fixed gate positioned within said tunnel member adjacent said platform and inwardly of and spaced from said first gate and extending transversely across said tunnel member, said first and second gates being substantially normal to the longitudinal axis of said tunnel member, a third upstanding fixed gate positioned within said tunnel member adjacent said platform and between and spaced from said first and second gates and extending diagonally across said tunnel member, each of said gates being provided with a plurality of spaced openings of gradually decreasing area extending vertically from the lower end thereof to a point adjacent to and spaced from the upper end thereof, the lower portions of each of said gates being flexible, and means outwardly of said second gate for extracting the removed shell jackets as the treated onions emerge from the openings in said second gate.

2. In an apparatus for removing shell jackets from dried onions, an open-ended tunnel member including spaced upstanding side pieces, a moving platform received between said side pieces and having a portion adjacent one end exteriorly of one of the open ends of said tunnel member and constituting a delivery apron for deposit thereon of a supply of dried onions from which the shell jackets are to be removed, a first upstanding fixed gate positioned within said tunnel member adjacent said platform and inwardly of and adjacent said one open end thereof and extending transversely across said tunnel member, a second upstanding fixed gate positioned within said tunnel member adjacent said platform and inwardly of and spaced from said first gate and extending transversely across said tunnel member, said first and second gates being substantially normal to the longitudinal axis of said tunnel member, a third upstanding fixed gate positioned within said tunnel member adjacent said platform and between and spaced from said first and second gates and extending diagonally across said tunnel member, a fourth upstanding fixed gate positioned within said tunnel member adjacent said platform and between and spaced from said third and second gates and extending diagonally across said tunnel member, said third and fourth gates extending diagonally across said tunnel member in opposite directions, each of said gates being provided with a plurality of spaced openings of gradually decreasing area extending vertically from the lower end thereof to a point adjacent to and spaced from the upper end thereof, the lower portions of each of said gates being flexible, and means outwardly of said second gate for extracting the removed shell jackets as the treated onions emerge from the openings in said second gate.

3. In an apparatus for removing shell jackets from dried onions, an open-ended tunnel member including spaced upstanding side pieces, and a top extending over the upper ends of said side pieces, a moving platform received between said side pieces and having a portion adjacent one end exteriorly of one of the open ends of said tunnel member and constituting a delivery apron for deposit thereon of a supply of dried onions from which the shell jackets are to be removed, a first upstanding fixed gate positioned within said tunnel member adjacent said platform and inwardly of and adjacent said one open end thereof and extending transversely across said tunnel member, a second upstanding fixed gate positioned within said tunnel member adjacent said platform and inwardly of and spaced from said first gate and extending transversely across said tunnel member, said first and second gates being substantially normal to the longitudinal axis of said tunnel member, a third upstanding fixed gate positioned within said tunnel member adjacent said platform and between and spaced from said first and second gates and extending diagonally across said tunnel member, a fourth upstanding fixed gate positioned within said tunnel member adjacent said platform and between and adjacent said third and second gates and extending diagonally across said tunnel member, said third and fourth gates extending diagonally across said tunnel member in opposite directions, each of said gates being provided with a plurality of spaced openings of gradually decreasing area extending vertically from the lower end thereof to a point adjacent to and spaced from the upper end thereof, the lower portions of each of said gates being flexible, and pneumatic means outwardly of said second gate for extracting the removed shell jackets as the treated onions emerge from the openings in said second gate.

4. In an apparatus for removing shell jackets from dried onions, an open-ended tunnel member including spaced upstanding side pieces, a moving platform received between said side pieces and having a portion adjacent one end thereof exteriorly of one of the open ends of said tunnel member and constituting a delivery apron for deposit thereon of a supply of dried onions from which the shell jackets are to be removed, a first upstanding fixed gate positioned within said tunnel member adjacent said platform and inwardly of and adjacent said one open end thereof and extending transversely across said tunnel member, a second upstanding fixed gate positioned within said tunnel member adjacent said platform and inwardly of and spaced from said first gate and extending transversely across said tunnel member, said first and second gates being substantially normal to the longitudinal axis of said tunnel member, a third upstanding fixed gate positioned within said tunnel member adjacent said platform and between and spaced from said first and second gates and extending diagonally across said tunnel member, a fourth upstanding fixed gate positioned within said tunnel member adjacent said platform and between and spaced from said third and second gates and extending diagonally across said tunnel member, said third and fourth gates extending diagonally across said tunnel member in opposite directions, each of said gates having a flexible portion extending from the lower end thereof to a point intermediate the upper and lower ends, each of said portions being provided with a plurality of spaced openings of gradually decreasing area extending vertically from the lower end thereof to a point adjacent to and spaced from the upper end thereof, the lower portions of each of said gates being flexible, and means outwardly of said second gate for extracting the removed shell jackets as the treated onions emerge from the openings in said second gate.

References Cited in the file of this patent

UNITED STATES PATENTS

| | | |
|---|---|---|
| 656,719 | Gibbs | Aug. 28, 1900 |
| 2,068,101 | Freund | Jan. 19, 1937 |
| 2,702,574 | Green | Feb. 22, 1955 |
| 2,750,977 | Vella et al. | June 19, 1956 |